F. M. LEAVITT.
STEERING MECHANISM FOR AUTOMOBILE TORPEDOES.
APPLICATION FILED MAR. 28, 1912.

1,080,116.

Patented Dec. 2, 1913.

3 SHEETS—SHEET 1.

WITNESSES:
René Bruine
Fred White

INVENTOR:
Frank M. Leavitt,
By Attorneys,
Fraser, Dunk & Myers

F. M. LEAVITT.
STEERING MECHANISM FOR AUTOMOBILE TORPEDOES.
APPLICATION FILED MAR. 28, 1912.
1,080,116.
Patented Dec. 2, 1913.
3 SHEETS—SHEET 2.
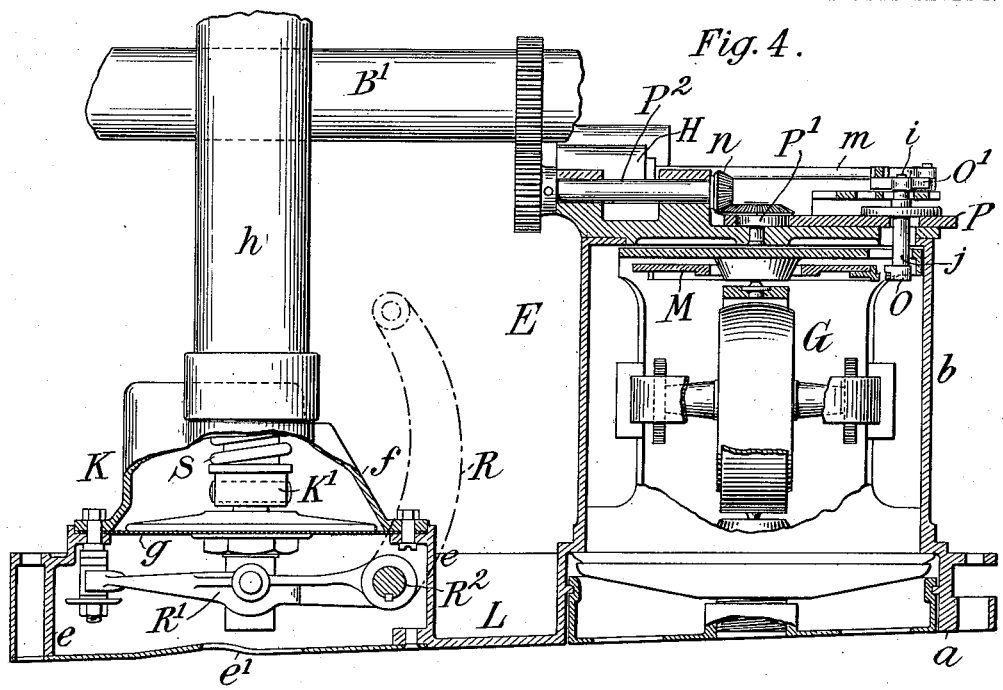
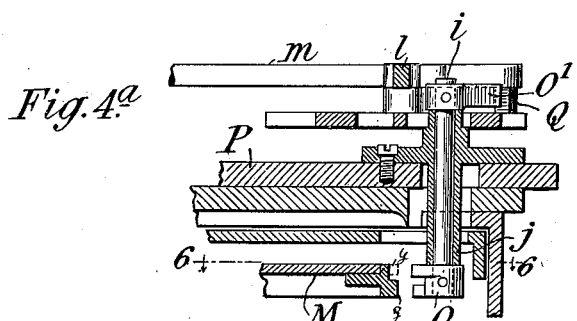
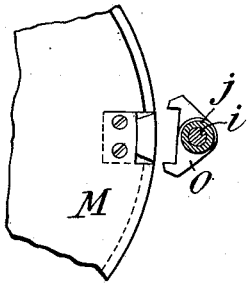
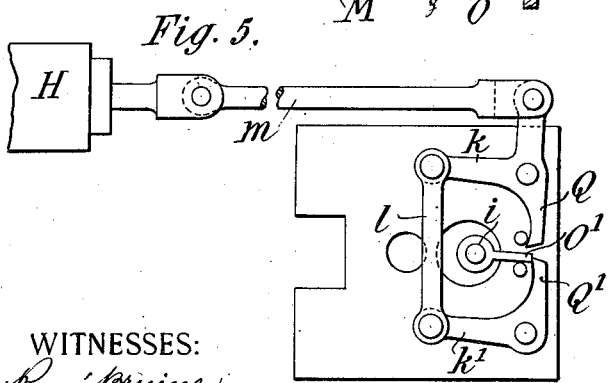
WITNESSES:
René Bruine
Fred White
INVENTOR:
Frank M. Leavitt,
By Attorneys,
Fraser, Dusk & Myers

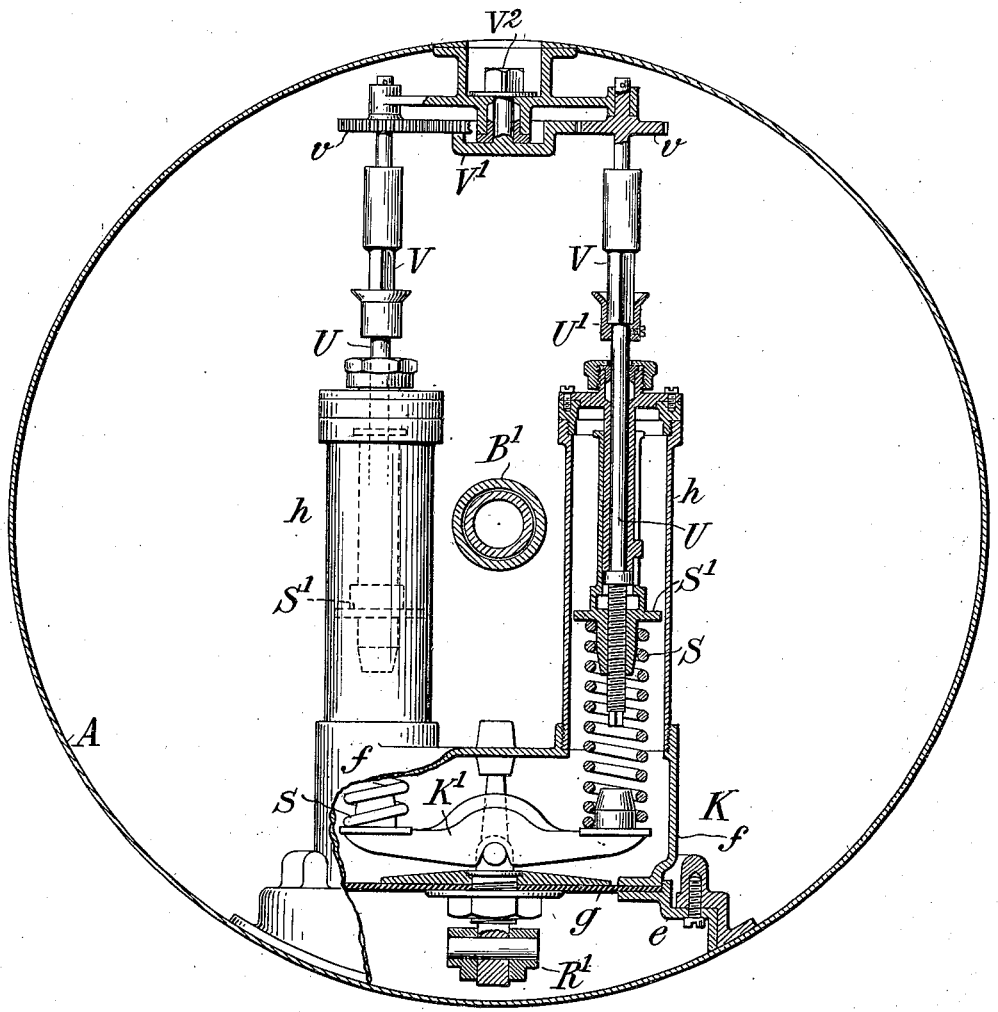

UNITED STATES PATENT OFFICE.

FRANK M. LEAVITT, OF SMITHTOWN, NEW YORK, ASSIGNOR TO E. W. BLISS COMPANY, OF BROOKLYN, NEW YORK, A CORPORATION OF WEST VIRGINIA.

STEERING MECHANISM FOR AUTOMOBILE TORPEDOES.

1,080,116.  Specification of Letters Patent.  Patented Dec. 2, 1913.

Application filed March 28, 1912. Serial No. 686,868.

*To all whom it may concern:*

Be it known that I, FRANK M. LEAVITT, a citizen of the United States, residing at Smithtown, in the county of Suffolk and State of New York, have invented certain new and useful Improvements in Steering Mechanism for Automobile Torpedoes, of which the following is a specification.

The steering of automobile torpedoes requires two steering mechanisms, the one for lateral steering or steering in the horizontal plane, and the other for depth steering or steering in the vertical plane. The former employs a vertical rudder, that is one turning on a vertical axis; while the latter employs a horizontal rudder, that is one turning on a horizontal axis. Heretofore these steering mechanisms have been entirely distinct, being separately fitted into the torpedo hull, and separately removable for adjustment or inspection.

According to the present invention the two steering mechanisms are assembled in one unit so that they may be inserted into or removed from the torpedo hull as one structure. This construction conduces to compactness, which is a primary requisite in an automobile torpedo; and it greatly facilitates the manipulation of the steering mechanisms and their adjustment and testing.

The invention also provides other features of construction incidental to these steering mechanisms.

In the accompanying drawings my invention is shown as applied to a torpedo of the well known Bliss-Leavitt type, the motor parts of the torpedo being omitted and only so much thereof being shown as is necessary to a comprehension of the application of the present invention.

Figure 1:
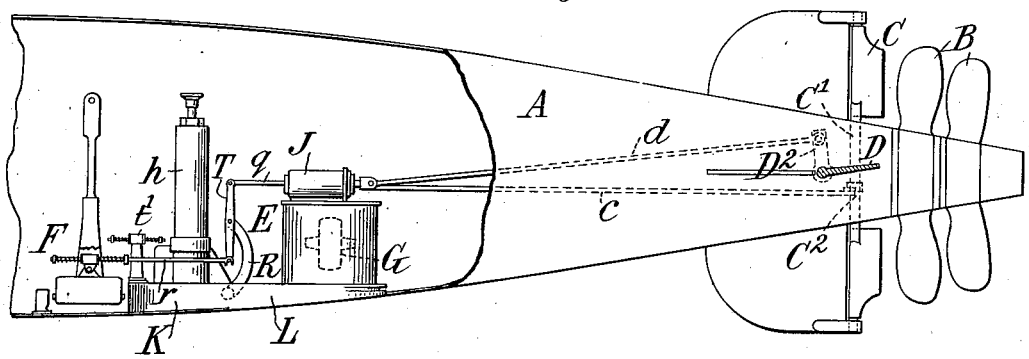
Figure 2:
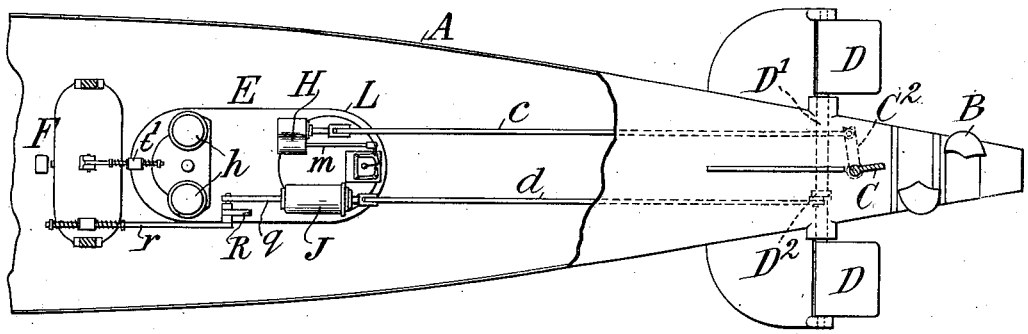
Figure 3:
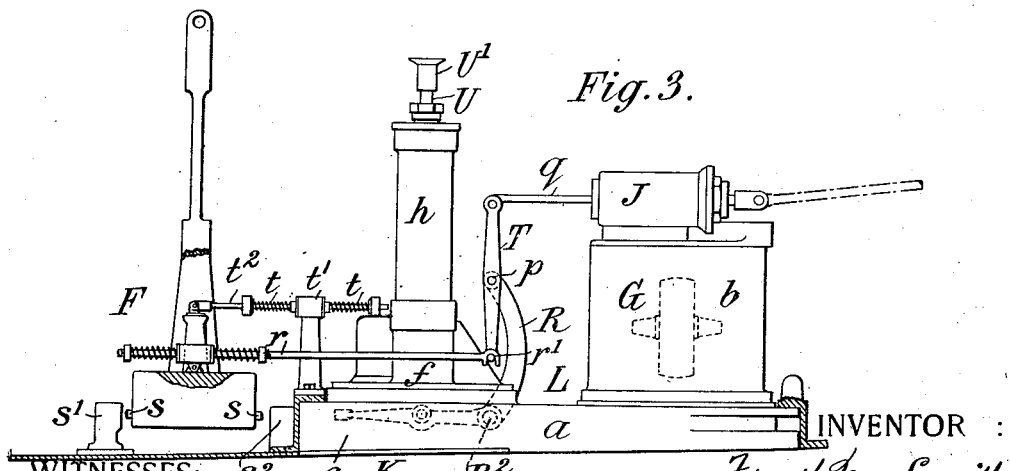

Figure 1 is a vertical longitudinal section of the after part of the torpedo body or hull, the tail portion being partly in elevation; Fig. 2 is a similar view, the section being in the horizontal plane; Fig. 3 is an elevation on a larger scale of the steering unit and the pendulum which is associated with the depth steering mechanism; Fig. 4 is a vertical longitudinal mid-section on a still larger scale, showing the steering unit, some portions thereof being in elevation; Fig. 4$^a$ is an enlarged fragment of Fig. 4; Fig. 5 is a fragmentary plan of the parts shown in Fig. 4$^a$; Fig. 6 is a fragmentary horizontal section on the line 6—6 in Fig. 4$^a$; Fig. 7 is a vertical cross-section of the torpedo hull showing parts of the depth steering mechanism and the depth adjusting means.

Referring to the drawings, A designates the torpedo hull or shell and B B the screw propellers.

C C are the vertical rudders mounted on the usual connecting shaft C′ and having the usual tiller arm C².

D D are the usual horizontal rudders mounted on the connecting shaft D′ and having the tiller arm D².

E is as a whole the steering unit, and F is the usual pendulum for coöperating with the depth steering mechanism.

G is the gyroscope which controls the lateral steering mechanism.

The respective steering mechanisms shown comprise steering engines or so-called servo-motors for operating the respective rudders; the lateral steering engine being lettered H and the depth steering engine being lettered J. The engine H transmits movement through a rod $c$ to the tiller of the vertical rudders C; and the engine J communicates motion through a rod $d$ to the tiller of the horizontal rudders D. The steering engines H and J may be replaced by any equivalent steering mechanism.

The lateral steering mechanism includes in addition to the engine H or its equivalent, any suitable control mechanism operated by the gyroscope G. Various such control mechanisms are known in the art. Similarly the depth steering mechanism comprises in addition to the engine J or its equivalent, a control mechanism whereby this engine responds to the control exercised by the reciprocal action of a hydrostat K and the pendulum F. No novelty is claimed for these respective control mechanisms, which will be presently described, but which may be substituted by any other known controlling means.

The steering unit E comprises a supporting frame or shell L which is adapted to be fastened removably to the torpedo hull, and which is shaped to support the respective elements of the lateral and depth steering mechanisms. The support L comprises preferably a base a adapted to fit into an opening in the bottom of the hull, and an upright shell b mounted thereon, this shell serving both to inclose the gyroscope and as a support for the engine cylinders J and H. The support includes also a shell e covered by a cap f so as to clamp between them the diaphragm g of the hydrostat. The cap f is formed with upright tubular extensions h forming chambers inclosing the springs S S of the hydrostat.

The lateral steering mechanism will now be described.

The gyroscope G is of the usual construction comprising a fly-wheel hung in gimbal rings and having mechanism (not shown) for spinning the fly-wheel and then unlocking its rings during the launching of the torpedo, as is well understood. The gyroscope is conveniently inclosed within the shell b in the manner shown in my Patent No. 925,709 granted June 22, 1909. The outer ring of the gyroscope is mounted to turn on a vertical axis in the usual manner, and is connected as heretofore to a cam disk M (Figs. 4, 4$^a$ and 6). This cam disk is thus held in fixed relation to the gyroscope, which as is well known tends to retain fixity of direction in space. As the torpedo veers from its prescribed course it causes the support L to turn (upon a vertical axis) around the disk M. This relative motion is utilized in the known manner for operating the steering mechanism. For the purpose of description, however, it is more convenient to treat the torpedo hull and the frame L and chamber b as remaining fixed, and the disk M as being turned on the vertical axis by the gyroscope. In any suitable way this relative movement is availed of to impart motion to the valve of the steering engine H. Of the several means for this purpose known in the art, the one here illustrated is of essentially the character set forth in United States Patent No. 795,045 granted July 18, 1905. The cam disk M performs the function of the disk lettered d in said patent, being modified to substantially the form shown in Patent No. 925,710 granted June 22, 1909; that is, it has a projection x and has ribs y z at different levels extending to opposite sides from such projection. A light tappet or "feeler" O is caused to move rapidly toward and from the periphery of the cam disk M. This feeler is a cross head having projecting toes on its opposite arms (Fig. 6) arranged at different levels (Fig. 4$^a$) so as to touch respectively the upper and lower peripheral cam ribs y z upon the disk M. The feeler is mounted on the lower end of a light spindle i the upper end of which carries a finger O' (Figs. 4$^a$ and 5). The spindle i turns in a long bearing sleeve j carried by a reciprocating slide P. The reciprocating movements of the slide cause the feeler O to move toward and from the disk M; on approaching the disk it will according to the position of the latter relatively to the torpedo either be centrally positioned by the projection x, or will receive a position such that one of its toes is lifted by the corresponding cam rib, while the other comes against the peripheral surface of the cam disk; thus the feeler O is turned to right or left and consequently turns the spindle i and finger O'. The receding movement then causes the finger O' to move against one or other of two pallets Q Q' (Fig. 5). These pallets are connected so that when one is pushed back the other moves forward. The connection shown is by means of parallel arms k k' and a connecting link l. Either pallet Q Q' is connected to a rod m which in turn is connected to the valve stem of the engine H. Thus as the disk M is turned relatively to the other parts by the gyroscope, its cam ribs cause the feeler O to turn to right or left, so that at the next movement of the finger O' it encounters the nearest tappet Q or Q' and pushes this back, thus rocking the tappets and moving the rod m endwise so as to reverse the valve, and consequently cause the piston of the engine H to move to the opposite end of its stroke. This movement is communicated through the rod c to the tiller operating the vertical rudders C C, so that these rudders are moved from port to starboard or vice versa.

For reciprocating the slide P it is connected to an eccentric P' formed integrally with a bevel gear which is driven by a bevel pinion n on a shaft P$^2$ which is geared to the propeller shaft B', a fragment only of the latter being shown in Fig. 4.

The depth steering mechanism or so-called diving gear will now be described.

As is well known, the depth mechanism is controlled primarily by a hydrostat, and secondarily by the pendulum F, the function of the hydrostat being to determine the set depth which the torpedo shall tend to follow, and the function of the pendulum being to keep the torpedo level and check any attempt to rise or dive. The hydrostat K comprises essentially the diaphragm g which is exposed on its under side to the water pressure admitted through a reduced opening e' (Fig. 4) and receives on its upper side the downward pressure of the springs S. The diaphragm is connected to a lever arm R' fixed on a shaft R$^2$ on which is fixed an upright arm R, these constituting a primary lever. The arm R′ moves at its free end above a stop-flange, as shown in Fig. 4, which limits its downward movement when the diaphragm is relieved of hydrostatic pressure. The arm R carries on its upper end a pivot $p$ on which is hung a secondary lever T the lower arm of which is connected to the pendulum F, while its upper arm connects with the valve rod $q$ of the steering engine J. The form of this engine here shown is of the "floating valve" type, the valve working in a chamber within the piston; but any type of engine may be used, or the engine may be substituted by any equivalent steering mechanism.

The pendulum F is connected to the lower arm of the lever by means of the rod $r$ which is connected to the pendulum through buffer springs as usual, and is connected to the lever arm by a suitable separable connection. The connection shown has a pin or stud $r'$ on the lever arm and a hook on the end of the rod $r$, as shown in Fig. 3. As the pendulum is hung permanently in the torpedo hull, it forms no part of the removable steering unit; this separable connection facilitates the correct coupling up of the parts when the steering unit is inserted into place in the torpedo hull. The pendulum is provided with the usual buffers $s$ $s$ on its fore and aft sides and has as usual a very limited swing between stops or abutments $s'$ $s^2$. The pendulum also has the usual check springs $t$ $t$, Fig. 3, which react against a middle support $t'$ and which connect to the pendulum through a rod $t^2$ in the usual manner, their function being to resist any swing of the pendulum and tend to hold it in its mid-position.

The use of two springs S S is preferable for symmetry and because, owing to the central position of the propeller shaft B′, it is impossible to locate a single spring in the center. By using two springs they may be placed each side of this shaft as shown in Fig. 7. They are shown as helical springs compressed between adjustable upper abutments S′ and a rock lever K′, which serves as an equalizer and bears centrally upon the top plate of the diaphragm. For adjusting the depth-steering mechanism to determine the depth to which it shall steer the torpedo, the stress of the springs S S is adjusted by raising or lowering their upper abutments S′. These abutments require to be adjusted simultaneously and equally. For this purpose they are constructed as vertical slides restrained from rotation and engaged by adjusting screws or threaded rods U U passing through them and having means for turning them simultaneously. The rods U U pass out through stuffing boxes in the tops of the respective tubular shells $h$ and their upper ends are provided with square socket-pieces or key-heads U′, which, when the unit E is put in place in the torpedo, are engaged by turning means permanently located in the torpedo shell, which means may advantageously be constructed as shown in Fig. 7. These means comprise square shafts V V having pinions $v$ $v$ in mesh with an intermediate gear V′, the spindle of which passes out through a stuffing box in the shell and terminates in a head V² sunk in a suitable socket and squared for engagement with a wrench or key by which it can be turned from the exterior. Index or dial graduations are commonly provided by which the operator can determine the extent of rotation and thereby vary as desired the vertical adjustment of the abutments S′ and hence the stress of the springs S.

The valve of the depth-steering engine J is moved by either a throw of the pendulum or by a movement of the diaphragm or by both, to such effect that the depth-steering apparatus acts to steer the torpedo to the prescribed depth, and thereupon corrects any tendency to rise or fall and hence to maintain the torpedo at such depth, as is well understood.

In order to remove the steering unit from the torpedo shell, it is only necessary to unscrew the attaching screws in its flange and remove it through the bottom opening in the hull. This movement automatically disconnects the adjusting heads U′ from the key-rods V; and disconnects the pin $r'$ from the hooked end of the rod $r$. The tiller rods $c$ $d$ may have been previously disconnected from the engine piston rod, or their connections may be such as to automatically disconnect themselves as the unit is withdrawn.

When the steering mechanisms are in the form of compressed air driven engines H and J, any suitable means may be provided for leading the compressed air to these engines, this means either being separable before the removal of the unit, or being automatically separated by such movement, as preferred.

When the steering unit is removed from the torpedo hull it may be placed upon a testing-stand and subjected to any of the prescribed tests for determining that the various elements of the steering mechanisms are in correct adjustment and operate in the required manner. Also, if any part becomes broken or impaired the entire unit may be set aside for repairs and a duplicate unit may be inserted in the torpedo in its place.

This invention is subject to considerable modification in matters of detail, as the mechanical construction of the various parts or elements may be greatly varied without departing from the essential features of the invention.

In place of the vertical and horizontal rudders any other lateral and depth-steering means may be provided.

I claim as my invention:—

1. In a torpedo, the combination with the hull and lateral and depth steering means, of steering mechanisms for such respective means, and a single support for both such mechanisms, removable at will from the hull.

2. In a torpedo, the combination with the hull and lateral and depth steering rudders, of steering mechanisms for such rudders, and a single support for both such mechanisms, removable at will from the hull.

3. In a torpedo, the combination with the hull and lateral and depth steering means, of steering engines for such respective means, and a single support for both such engines removable at will from the hull.

4. In a torpedo, the combination with the hull and lateral and depth steering means, of a removable steering control unit comprising a support detachably united to the hull, and lateral and depth steering mechanisms carried by said support and having detachable connections with their respective steering means.

5. In a torpedo, the combination with the hull and lateral and depth steering rudders, of steering engines for such respective rudders, having detachable connections with their respective rudders, and means for operating their respective valves, and a support carrying said engines and valve-operating means as a single unit, removable as a whole from the hull.

6. In a torpedo, the combination with the hull and lateral and depth-steering rudders, of steering mechanisms for such rudders, and a single support for both such mechanisms, removable at will from the hull, the lateral steering mechanism comprising a gyroscope carried by said support.

7. In a torpedo, the combination with the hull and lateral and depth-steering rudders, of steering mechanisms for such rudders, and a single support for both such mechanisms removable at will from the hull, the lateral steering mechanism comprising a gyroscope carried by said support, a cam disk oscillated by said gyroscope, a reciprocating feeler moving toward and from such cam disk, tappets actuated according to the position of such feeler, and a connection from said tappets for controlling said lateral steering mechanism.

8. In a torpedo, the combination with the hull and lateral and depth steering rudders, of steering mechanisms for such rudders, and a single support for both such mechanisms, removable at will from the hull, the depth-steering mechanism comprising a hydrostat carried by said support.

9. In a torpedo, the combination with the hull and lateral and depth steering rudders, of steering mechanisms for such rudders, and a single support for both such mechanisms, removable at will from the hull, the depth-steering mechanism comprising a hydrostat carried by said support, and a pendulum mounted in the hull, and a detachable connection between such pendulum and the steering mechanism.

10. In a torpedo, the combination with the hull and lateral and depth steering rudders, of steering mechanisms for such rudders, and a single support for both such mechanisms, removable at will from the hull, the depth-steering mechanism comprising a hydrostat carried by said support, a lever actuated by said hydrostat, a secondary lever hung on said lever and connected to operate the steering mechanism, and a pendulum connected to said secondary lever.

11. In a torpedo, the combination with the hull and lateral and depth steering rudders, of steering mechanisms for such rudders, and a single support for both such mechanisms, removable at will from the hull, the depth-steering mechanism comprising a hydrostat carried by said support, said hydrostat comprising a diaphragm and a pair of upright springs pressing upon said diaphragm, and said support comprising upright shells inclosing said springs and arranged to either side of the propeller shaft of the torpedo.

12. In a torpedo, the combination with the hull and lateral and depth steering rudders, of steering mechanisms for such rudders, and a single support for both such mechanisms, removable at will from the hull, the depth steering mechanism comprising a hydrostat carried by said support, said hydrostat comprising a diaphragm and a pair of upright springs, an equalizing lever through which the stress of said springs is communicated to said diaphragm, and said support comprising upright shells inclosing said springs and arranged to either side of the propeller shaft of the torpedo.

13. In a torpedo, the combination with the hull and lateral and depth steering rudders, of steering mechanisms for such rudders, and a single support for both such mechanisms, removable at will from the hull, the depth steering mechanism comprising a hydrostat carried by said support, such hydrostat comprising a diaphragm and a spring with adjusting means for such spring comprising an upright rotative rod carried by said support, and means for turning such rod carried by the torpedo hull.

14. In a torpedo, the combination with the hull and lateral and depth steering rudders, of steering mechanisms for such rudders, and a single support for both such mechanisms, removable at will from the hull, the depth steering mechanism comprising a hydrostat carried by said support, such hydrostat comprising a diaphragm and a pair of springs with means for adjusting the stress of said springs, comprising upright rotative screw rods carried by said support, means carried by the torpedo hull for engaging the respective rods, and a rotative part accessible from the exterior and geared to said respective means whereby to simultaneously adjust both springs.

In witness whereof, I have hereunto signed my name in the presence of two subscribing witnesses.

FRANK M. LEAVITT.

Witnesses:
H. C. SEAMAN,
G. W. A. MURRAY.